3,169,823
PROCESS FOR TREATING POLYOLEFIN MATE-
RIALS WITH WERNER COMPLEXES AND THE
DYEING OF SAME
Domenick Donald Gagliardi, 185 Howland St.,
East Greenwich, R.I.
No Drawing. Filed May 23, 1962, Ser. No. 196,908
11 Claims. (Cl. 8—55)

This invention relates to the treatment of polyolefin articles and to the resulting products. More particularly, it concerns modification of preformed fibers, films and other shaped articles of solid polymers of olefins so that they will have greater affinity to materials used to coat, color or otherwise finish or ornament the articles.

High molecular weight polymers of ethylene, propylene and other olefins have been developed which possess great strength and many other desirable properties. Such olefin polymers have become of great commercial importance and are being sold and used in very great amounts because of their low cost coupled with their many attractive physical and chemical properties. They are being molded, extruded or otherwise fabricated into thousands of different types of household and industrial articles and these new plastics are responsible for the creation of many new industries to handle their fabrication and use.

Articles of thin section, such as fibers and films, constitute a major use of high molecular weight polyolefins. Fibers alone constitute a potential enormous outlet for polyolefins which are expected to find ever increasing use in the production of carpets or other floor coverings, fabrics for wearing apparel, furniture and seat covering and every other use for textile fibers and fabrics which employ large quantities of filaments or yarns. Future possible use of films of the polyolefins for packaging and many other uses staggers the imagination.

Although the polyolefins have the attractions which have fostered such high quantity use, they do have certain disadvantages. For example, since the polymers are so inert to most chemical agents, shaped articles made therefrom cannot be dyed, colored or coated satisfactorily using conventional dyeing and coating materials and techniques. It is well known that none of the anionic coloring agents nor other anionic finishing agents have any affinity to polyolefin materials. Also, the simple chrome complexes of fatty acids which are used as coating or finishing agents for many substances do not adhere to polyolefins.

A tremendous amount of research and development work has been devoted to attempts to overcome these coloring and coating problems and to make the polyolefins receptive to dyes, coatings or the like. Unless these difficulties of dyeing and coloring the polymers are surmounted, the ultimate commercial markets and fields of applications of the polyolefins will be very substantially restricted.

A principal object of this invention is the provision of new processes for treatment of preformed articles of solid olefin polymers in order to improve surface properties thereof. Further objects include:

(1) The provision of new processes for improving the receptivity of fibers, yarns, fabrics, films and other shaped solid articles of solid olefin polymers to anionic dyes and other anionic finishing agents.

(2) The provision of new processes for modifying the surfaces of preformed articles of solid polyolefins so as to obtain greater adhesion between such surfaces and coatings that are applied to the surfaces.

(3) The provision of new processes for rendering fibers, films or other preformed articles of solid polymers of olefins which are normally substantially incapable of being satisfactorily dyed, capable of being dyed in level, deep shades with conventional anionic dyes using conventional dyeing methods.

(4) The provision of new methods for improving the surface receptivity of preformed articles of solid polyolefins that may be carried out in equipment conventionally available and which can be used in conjunction with conventional, commercially available anionic dyestuffs or other anionic finishing agents.

(5) The provision of new, improved forms of preformed articles of solid polyolefins possessing improved receptivity to anionic dyes and finishing agents.

(6) The provision of new and improved fibers, yarns, fabrics, films, and other shaped solid articles of solid polymers of olefins having improved dye receptivity, and greater adhesion to resinous or other coatings applied to the surfaces of the preformed articles.

(7) The provision of new methods for increasing the ability of polyolefins to retain water-repellent agents, pigments and other coating or finishing materials which may be applied to the surfaces of the polyolefin articles.

Other objects and further scope of applicability of the present invention will become apparent from the detailed description given hereinafter; it should be understood, however, that the detailed description and specific examples, while indicating preferred embodiments of the invention, are given by way of illustration only since various changes and modifications within the spirit and scope of the invention will become apparent to those skilled in the art from this detailed description.

These objects are accomplished according to the present invention by the treatment of preformed articles of solid olefin polymers with a Werner chrome complex of an amino acid containing at least 6 carbon atoms. A preferred procedure of operating is to apply to the preformed section of solid olefin polymer about 0.01 to 10% of a Werner chrome complex having the formula:

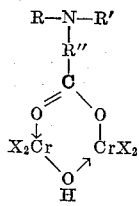

wherein R is an alkyl or alkenyl radical containing at least 6 carbon atoms,

R' is a hydrogen, alkyl, cycloalkyl, aryl, or carboxyalkyl radical,

R" is an alkylene, aralkylene, or aminoalkylene radical, and

X is a halogen radical, particularly chlorine.

After the chrome complex is applied, the article surface is heated to an elevated temperature to permanently associate the chrome complex with the article and produce a change in its surface characteristics. Preferred temperatures of heating are from about 10° C. below the melting point of the olefin polymer down to about 100° C.

The article surface is rendered receptive to anionic agents by this treatment. Such agents can then be cohesively united to the article. For example, anionic dyes may be applied and the article will be dyed in level, deep shades even though it would not dye with the coloring agent before the treatment. More specifically, the treated article becomes receptive to many anionic agents including the following:

(1) Water-soluble direct dyes
(2) Fiber reactive dyes
(3) Sulfur dyes
(4) Naphthol dyes
(5) Vat dyes
(6) Acid wool dyes
(7) Anionic pigments
(8) Anionic water repellents
(9) Anionic germicidal agents
(10) Anionic adhesive resins
(11) Anionic phosphorous compounds
(12) Anionic fluorocarbon latices
(13) Anionic acrylic latices
(14) Premetallized acid dyes
(15) Anionic polyvalent metal salts Broadly stated, the anionic agents which are rendered receptive to the polyolefins by this treatment are those containing sulfonic, carboxyl, phosphoric, ketonic and phenolic groups, e.g., sulfomethylated polyacrylamides, polyacrylic acid, polyvinyl pyrrolidone, acrylic acid copolymers, phenol-formaldehyde resins, epoxy resins, polyamide resins, organic phosphoric acids, polyester resins, alkyd resins, carboxymethyl cellulose, sodium alginate, perfluoroacids, resin, pigment binders, and silica sols.

The anionic agent may be applied at any suitable stage, but it has been found that improved results are obtained if the article is scoured or otherwise treated to remove excess chrome complex treating material before applying the anionic agent.

The application of the chrome complex material can be by impregnation, spraying, coating, contact with liquid bath or any other suitable fashion. The contacting of the treated article with the cationic agent may be accomplished while the cationic agent is in the vapor or liquid form including solutions in organic solvents, aqueous dispersions or emulsions, as a component of molten bath, or from solubilizing systems using salts or other compounds.

According to a preferred embodiment, a two-step procedure for coloring preformed articles of olefin polymers involves first treatment of the polyolefin article with the chrome complex treating solution followed by dyeing or other coloring or coating of the surface of the article. In the case of textile materials, the modified, treated fabric may be colored by padding through a bath of acidic dyestuffs followed by drying of the colored material. Alternatively, the modified textile material may be printed with dye-printing systems utilizing conventional techniques.

The new article treatments as outlined above may be modified with preliminary, simultaneous or subsequent auxiliary processes and agents including wetting agents, leveling agents, thickening agents, anti-crocking agents, emulsifiers, water-repellents, oil-repellents and the like.

The success of the present invention is due in part to the discovery that the treating agent used for modification of the surface of the preformed polyolefin article produces a permanent improvement in the surface characteristics of the article that is permanent. In other words, the change in the article surface creating improved dye receptivity, adhesion to coatings, etc., is not destroyed by washing, scouring, dry-cleaning, or other normal handling or processing operations to which fibers, films or other preformed articles of polyolefins would be subjected. On the other hand, these treatment procedures do not visibly affect the preformed articles nor detract from the strength or other desirable properties of the articles. Whether partial or complete penetration of the treating reagent into the fibers, films or other articles takes place is presently not known. In any event, the results of the treating procedures contrasts greatly with known behavior of surface coating where the color or other effect obtained by the coating is easily removed by rubbing, by wear or by washing and dry-cleaning processes. The result appears to be unique to the amino acid chrome complexes since simple chrome complexes of fatty acids such as stearic, lauric, hydroxystearic acid, benzoic acid and the like do not produce any improved affinity of anionic agents to polypropylene and other polyolefins.

The following list is exemplary of the amino acids from which Werner chrome complexes may be formed to be used in treating polyolefin articles in accordance with the invention. Mixtures of two or more of the resulting chrome complexes may be used in the procedures or a plurality of such reagents may be applied in separate treating steps.

N-octadecyl glycine
N-dodecyl alanine
N-octyl phenylalanine
N-octadecyl proline
N-dodecyl lysine
N,N'-dioctyl lysine
N-octadecyl,N-carboxypropyl glycine
N,N-bis carboxypropyl octyl amine
N-hexadecyl leucine
N,N-dihexyl alanine
N-methyl,N-carboxyethyl stearyl amine
N-dodecyl-2-phenyl proline
N-octadecyl,N-cyclohexyl glycine
17-carboxy distearyl amine
N-hexyl leucine
N-hexadecyl glycine
N,N-bis carboxy isobutyl hexadecyl amine
N-octadecyl,N-cyclohexyl phenylalanine
6-aminohexyl-N-carboxyethyl stearyl amine
1-decyl-2-carboxypiperazine
1-lauryl-4-carboxypiperidine
N-carboxymethyl mixed fatty alkyl amine
N-cocoalkyl glycine The polyolefin materials which may be treated with the process of this invention include fibers, yarns, films, fabrics for household, garment and industrial uses. For example, in using polypropylene cloth and film tapes, the process may be used to produce adhesion of pressure sensitive anionic resins and glues to the tape substance. Or in household textiles, the process may be used to produce coloring and printing with anionic dyestuffs and coloring agents. In laminating and coated substrates, the process may be used to improve adhesion of the polyolefin to the coating resins and polymers.

A further understanding of the new procedures and resulting products of this invention may be had by reference to the following specific examples of actual operations in accordance with the invention. In these examples and throughout the remainder of the specification and claims, all parts or percentages are by weight unless otherwise specified.

*Example 1*

Samples of fabric woven from polypropylene fibers were treated by padding with an aqueous solution containing 5% of the Werner chrome complex of N-stearyl amino-propionic acid and 0.6% of a non-ionic wetting agent. After drying for 10 minutes at 105° C. and then curing for 15 minutes at 120° C., the fabrics were scoured with 0.1% non-ionic detergent and 0.5% sodium carbonate at 60° C. to remove excess treating agent. Then pieces of the treated fabric were dyed with the following anionic dyestuffs:

"Wooncolan Black WA," an acid wool dye which is identified as C.I. 15711 in the 1956 edition of the "Technical Manual of the American Association of Textile Chemists and Colorists."

"Cibacron Brilliant Blue BR," a fiber reactive dye reported on page 2796 of "Collection of Czechoslovak Chemical Communications," vol. 25, No. 10, October 1960, to have the following structure:

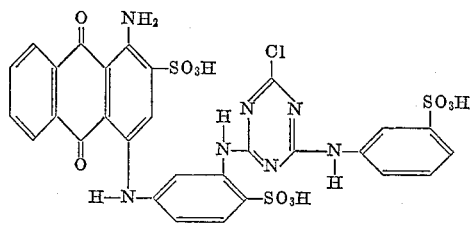

Each dye bath contained 3% dye based on fabric weight and a 30:1 bath: fabric ratio. Specimens were placed in the respective dye bath at 30° C. and the bath was heated to 85° C. in 30 minutes. Dyeing was continued for 30 minutes at 85° C. At the end of this time, the specimens were removed from the dye bath and were scoured with 0.1% of a non-ionic detergent and 0.5% sodium carbonate at 60° C., rinsed and dried. All the specimens which had been treated with the Werner chrome complex of N-stearyl aminopropionic acid were deeply colored with all dyestuffs. Untreated samples of the fabric were subjected to the same dyeing conditions. All of these untreated samples were either still white or only faintly tinted after the dyeing operation.

*Example 2*

Samples of fabric made of polypropylene fibers were treated as in Example 1 with a solution containing 5% of the Werner chrome complex of N-dodecyl aminopropionic acid. The specimens were then dyed with anionic dyestuffs along with specimens of the untreated fabric.

Each dye was used according to normal dyeing procedures. After dyeing and scouring, the specimens were dried. Examination revealed that all the specimens pretreated with the Werner chrome complex of N-dodecyl aminopropionic acid were colored while the untreated specimens were either non-colored or only faintly stained.

*Example 3*

A sample of polyethylene film was coated with a 5% isopropanol solution of the Werner chrome complex of N-lauryl iminodipropionic acid and dried 15 minutes at 95° C. This specimen and a piece of untreated film were then coated with a pigment dispersion containing 3% phthalocyamine blue and 3% of an acrylic resin polymer containing free carboxy groups. After drying 15 minutes at 95° C. the specimens were boiled for 5 minutes in 0.5% synthetic detergent solution. The pigment coating was removed from the unmodified polyethylene. The treated polyethylene retained the colored finish.

*Example 4*

A sample of polypropylene film was coated with an aqueous solution containing 10% of the Werner chrome complex of N-hexadecyl glycine and dried for 10 minutes at 120° C. This film and an untreated specimen were then immersed in an aqueous solution containing 3% perfluorooctanoic acid. The specimens were dried for 15 minutes at 105° C., scored with 0.5% synthetic detergent and dried. The specimen which had been pretreated showed a high degree of improvement of both water and oil repellency while the untreated specimen showed no difference in oil or water repellency as compared with the original polyethylene film.

*Example 5*

A piece of fabric woven from yarn spun of stable fibers of polypropylene was treated with the Werner chrome complex of N-stearyl aminopropionic acid as in Example 1. It was then treated with a 5% solution of colloidal silica, dried, scoured with 0.5% synthetic detergent, rinsed and dried again. A piece of the untreated fabric was also treated with the silica solution. Both fabrics, after the scouring, were examined. The specimen pretreated with the Werner chrome complex was effectively delustered and was highly soil resistant as compared to the untreated piece.

The invention is applicable to treatment of any articles made of solid polymers of olefins which, in the absence of the treatment, would not be receptive to dyestuffs, would have a propensity to acquire static electrical charges or would exhibit a lack of adhesion to anionic finishing agents or coatings which might be applied to the surface of the articles. Those olefin polymers which are of particular importance with respect to the new treatments are the class of solid polymers that have an inherent viscosity of at least 0.8 and particularly those having an inherent viscosity between about 1.2 and about 10. The term "inherent viscosity" as used herein, means the viscosity of a solution of 0.2 gram of the polymer in 50 cc. of tetralin at 130° C. The invention finds special applicability to the treatment of solid polymers of olefins of 2 to 4 carbon atoms.

The various types of olefin polymers which may be treated in accordance with the invention are extensively described in the patent and technical literature, e.g., see "Encyclopedia of Chemical Technology," first supplement volume (1957), pp. 699–712 and second supplement volume (1960), pp. 661–672. Unquestionably, yet unknown olefin polymers will be developed to which the procedures of the invention may be applied.

The new surface treatment procedures are applicable both to homopolymers of olefins and interpolymers of olefins with unsaturated hydrocarbons or other polymerizable materials resulting in solid polymers that are incapable of being satisfactorily dyed or coated because of the general inertness of the polymer. The new procedures are of particular importance in the treatment of fiber-forming polymers such as fiber-forming polyethylene, polypropylene or other homopolymers or copolymers of 2 to 4 carbon atom α-olefins. The Textile Fiber Products Identification Act (Public Law 85–897), defines olefin fibers as "any manufactured fiber in which the fiber-forming substance is a long chain synthetic polymer composed of at least 85% by weight of ethylene, propylene or other olefin units." The new treatments of this invention are contemplated for use in connection with all olefin fibers as so defined.

Various proportions of the Werner chrome complexes of the six or more carbon atoms containing amino acids relative to the polyolefin may be employed. For example, in a padding method of applying the treating material from a solution to a fabric, satisfactory results may be obtained by the application of about 25% to 200% by weight of treating solution containing about 0.1 to 5% of the chrome complex. Deposition of between about 0.01 to 10% by weight of the treating reagent has been found to be particularly useful. Where the operation is used in conjunction with the dyeing of the fiber or other article and lighter shades are desired, lower amounts of the treating reagent are most economical to use. In general, the amount of treating reagent deposited is determined by the depth of shade of dyeing required or the degree of other change in surface characteristic required. The concentration of the reagents in the treating solution will likewise depend upon the degree of modification desired and also the proportion of solution to be applied relative to the treated article.

The treating solutions or other systems may include auxiliary agents such as various salts of organic acids. Also, they may include reagents to improve wash fastness, light fastness or other aspects of the final products. Such auxiliary agents would, for example, include synthetic resins, e.g., acrylic resins, amino-aldehyde resins, vinyl resins as well as wetting agents, leveling agents, emulsifiers, anti-oxidants, light-preserving agents or the like.

In order to insure a permanent effect of the treating solution upon the polyolefin fibers or other articles, one should employ what may be referred to as a heating or aging step. This may be accomplished by heating the article in contact with the treating reagent to elevated temperatures, e.g., 100° to 250° C. for a period of about 1 to 120 minutes, preferably, 1 to 15 minutes, depending to some extent upon the degree of modification desired and other considerations. The higher the temperature, normally the less time is required for the predetermined degree of modification to be attained. Temperatures within the range of about 50° C. up to about 10° C. below the melting point of the polymer are useable. This aging phase of the treating methods may be effected by other ways than direct heating, e.g., flash diffusion of the treating agent under pressure or in the presence of superheated steam, use of radiant energy or the like.

After the treatment of the polyolefin article with the treating reagent, it is normally desirable to remove surplus reagent. Such surplus removal, particularly in the case of fibers and textiles, is typically carried out by scouring the article to remove the loosely held treating reagent. For this purpose, conventional textile scouring techniques, dry-cleaning techniques or the like may be employed. Such cleaning procedures are generally followed by rinsing or drying, but the treatment procedure may be immediately followed by dyeing or printing steps without cleaning the surplus treating agent from the article surface. This is particularly true where the surplus would have no detrimental effect upon dyeing, coloring, printing or subsequent coating compositions. Neutralizing agents may be used to advantage in such residue removal operations.

The dyeing of treated polyolefin fibers, fabrics, films or the like following the surface modification thereof may be carried out with the acidic dyes in conventional manners common to the art of dyeing textile in machines such as the jig, beck, pad-steam range and pressure dyeing equipment. The conventional dyeing assistants, such as level agents, wetting agents, alkali salts, dye fixing agents, copper salts, chromium salts, etc., may be used in the process to produce uniform dyeing or to improve light fastness, wash fastness or the like as desired.

Dye baths typically will contain about 1–2% of the dye based on the weight of the fabric and dyeing may be conducted with a bath/fabric ratio of about 10:1 to 100:1. Other conventional conditions used in dye operations may be employed.

The treatment of the polyolefin materials may be carried out at any suitable stage. For example, in the case of continuous filaments, the treatment with the chrome complex may be accomplished immediately after spinning. In the case of yarns made of spun staple fibers, the treatment can be effected before the yarns are formed by operation upon the staple fiber or after formation of the yarn. Alternatively, fabrics can be woven from untreated monofilaments or spun yarn, after which they can be subjected to the new treatments and then dyed, colored, coated or subjected to other operations. This gives great flexibility to manufacturers and users of polyolefin fibers, films or other articles. For example, it enables the manufacturers of filaments and films to produce one commodity, rather than a whole series of modified materials, since, using the procedures of this invention, treatment of the polyolefin articles to make them receptive to dyeing or other coating operations can be conducted at the plant of the fabric manufacturer. Also, the new operations enable the textile processor or manufacturer to utilize the advantages of the new operations without making large investments in special processing equipment or in special training of personnel.

The treatment operations of the invention may be used for modification of olefin fibers when they constitute a portion of blended fabrics, e.g., when the fabrics are woven in admixture with polyester fibers, nylon fibers, silk fibers, cotton fibers or the like. On other hand, it may be preferable to treat the olefin fibers prior to the weaving, knitting or other fabrication of the blended fabric, particularly where blended fabrics having multiple dye substantive properties are to be processed.

What is claimed is:
1. A process of improving the dye receptivity of polypropylene fibers which comprises:
    (a) providing an aqueous solution containing about 5% of the Werner chrome complex of N-stearyl aminopropionic acid,
    (b) padding polypropylene fibers with said solution,
    (c) drying the padded fibers for about 10 minutes at 105° C.,
    (d) heating the dried fibers at 120° C. for about 15 minutes, and
    (e) scouring the treated fibers to remove the excess treating agent.
2. A process for improving the ability of a preformed article of solid olefin polymer to retain on the surface thereof materials applied thereto which comprises coating the surface of the article with a Werner chrome complex of an amino acid having the following formula:

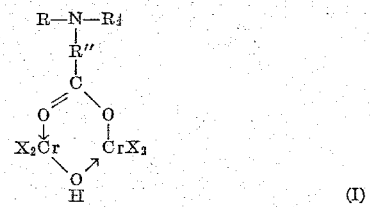

(I)

wherein
    R is a radical selected from the group consisting of alkyl and alkenyl radicals containing 6 to 20 carbon atoms,
    R' is a radical selected from the group consisting of hydrogen, alkyl, cycloalkyl,
    R'' is a radical selected from the group consisting of alkylene, aralkylene, aminoalkylene, aryl, and carboxyalkyl, and
    X is a halogen radical and heating the coated preformed article to an elevated temperature between about 100° C. and 10° C. below the melting point of the polymer of which the article is formed for a time between about 1 to 120 minutes.
3. A process of producing dyeable olefin fibers which comprises:
    (a) contacting olefin fibers with a Werner chrome complex of an amino acid containing 6 to 20 carbon atoms, and
    (b) heating the olefin fibers in contact with the Werner chrome complex to an elevated temperature to permanently affix said complex to the surface of the fibers, the resulting fibers being characterized by their ability to be dyed in deep shades with acid dyes.
4. A process of treating a preformed polyolefin article which comprises:
    (a) contacting said article with a Werner chrome complex of an amino acid containing 6 to 20 carbon atoms,
    (b) heating the article while in contact with said chrome complex to a temperature between about 10° C. below the melting point of said polyolefin article and 100° C., and
    (c) removing surplus chrome complex from the article, the resulting treated article being characterized by receptivity to anionic dyes permitting the article to be dyed in deep shades with anionic dyes using conventional dyeing procedures.
5. A process of dyeing olefin fibers in deep shades which are fast to laundering and dry-cleaning which comprises:
    (a) contacting olefin fibers with a Werner chrome complex having the Formula I of claim 2,
    (b) heating the fibers while in contact with said chrome complex to a temperature between about 10° C. below the melting point of said fibers and 100° C. to effect a permanent association of said complex with the fibers, (c) cleaning the fibers to remove chrome complex not permanently associated with the fibers, and (d) dyeing the fibers with a water-soluble anionic textile dye.

6. Fibers composed essentially of a homopolymer of an α-olefin of two to four carbon atoms and having an invisible layer of a Werner chrome complex of a 6 to 20 carbon atom amino acid permanently associated with the surface thereof, said fibers being receptive to anionic dyes and being capable of being dyed in deep shades with conventional anionic dyes using conventional dyeing methods.

7. A polyolefin film having the ability to adhere strongly to inks, cements and other coating compositions applied thereto which comprises an invisible layer of a Werner chrome complex of the Formula I as defined in claim 2, said layer constituting between about 0.01 and 10% by weight of the weight of the film, said layer being substantially completely resistant to removal from said film without destruction of the film.

8. A process of modifying the surface of a preformed article of solid olefin polymer, which article has a relatively thin cross-section, which comprises:

(a) providing an aqueous solution containing about 1 to 10% of a Werner chrome complex of a 6 to 20 carbon atom alkyl amino monocarboxylic acid, (b) applying about 10 to 200% by weight of said solution to said article, (c) heating the article to dry it and permanently attach the complex to the surface of the article, and (d) removing any of said complex from the article which has not become permanently attached thereto as a result of step (c).

9. Fibers formed of solid olefin polymer that are receptive to water-soluble anionic dyes and finishing agents by the presence in the fibers of between about 0.01 to 10% by weight of fibers of a Werner chrome complex of an N-alkyl amino monocarboxylic acid containing 6 to 20 carbon atoms, said complex being primarily contained in the surface portions of fibers, said fibers having the visual appearance of untreated fibers and being free of any separate surface coatings.

10. A preformed article of solid olefin polymer that normally would not be capable of being dyed in deep shades with water-soluble anionic dyes from aqueous dye baths, the article being characterized by receptivity to water-soluble anionic dyes whereby the article may be dyed in deep shades with aqueous dye baths of anionic dyes, said article containing between about 0.01 to 10% by weight, based upon the weight of said solid olefin polymer, of a Werner chrome complex of the Formula I as defined in claim 2, said complex being carried in the article as an impregnant of the surface portion of the article, the surface of said article being free of any separable coating that is marked by an interface separating the coating and said article surface.

11. Fibers formed of solid polymer of a 2 to 4 carbon atom α-olefin that normally would not be receptive to water-soluble dyes, the fibers being capable of being dyed in deep shades with aqueous dye baths of anionic dyes, said fibers containing between about 0.01 to 10% by weight of the fibers of a Werner chrome complex of the Formula I as defined in claim 2, said fibers having the same visual appearance and strength characteristics of the same fibers that do not contain said complex, said complex being carried in the fibers as a surface impregnant and said fibers being free of a separable coating that can be distinguished by an interface separating the coating from the article surface.

References Cited by the Examiner
UNITED STATES PATENTS 2,984,634  5/61  Caldwell et al. _____ 8—55
3,023,072  2/62  Dabrowski.

NORMAN G. TORCHIN, *Primary Examiner.*

ABRAHAM H. WINKELSTEIN, *Examiner.*